United States Patent Office 3,830,753
Patented Aug. 20, 1974

3,830,753
CATALYST FOR AMMONIA SYNTHESIS AND A PROCESS PRODUCING THE CATALYST
Masaru Ichikawa, Tokorozawa, Toshihiko Kondo, Sagamihara, and Kenzi Tamaru, Kamakura, Japan, assignors to Sagami Chemical Research Center, Tokyo, Japan
No Drawing. Filed Sept. 13, 1971, Ser. No. 180,187
Claims priority, application Japan Sept. 14, 1970, 45/80,335; Nov. 25, 1970, 45/103,409
Int. Cl. B01j 11/22, 11/78
U.S. Cl. 252—441     5 Claims

ABSTRACT OF THE DISCLOSURE

A novel catalyst for ammonia synthesis and a process for producing the catalyst are described. The catalyst comprises (a) graphite, (b) a transition metal compound and (c) an alkali metal. The catalyst of this invention is capable of synthesizing ammonia from hydrogen and nitrogen or air at a relatively low temperature even at room temperature under normal or a reduced pressure.

BACKGROUND OF THE INVENTION

The present invention relates to a catalyst for ammonia synthesis. More particularly, this invention relates to a catalyst for ammonia synthesis comprising (a) graphite, (b) at least one of transition metal compound and (c) an alkali metal.

Conventional commercial processes for ammonia synthesis include Haber-Bosch Process, Claude Process and Mont-Cenis Process. As the main ingredient of the catalyst, the first two are produced from molten iron oxide, while the last one is produced from an iron-cyano complex salt. All three of these catalysts are produced by subjecting a mixture of an iron compound and promoter to a reduction treatment.

However, all these processes for ammonia synthesis are carried out at a high temperature (about 300 to 500° C.) and under a high pressure (about 500 to 1,000 atm.). Further, these processes are accompanied by a defect in that high-purity hydrogen and nitrogen are required, because the activity of the catalyst is diminished with the presence of oxygen and carbon monoxide in the synthesis gas.

DETAILED DESCRIPTION OF THE INVENTION

The catalyst according to the present invention is novel, being entirely different from any one of the conventional catalysts in respect of composition. Furthermore, the catalyst according to this invention is capable of synthesizing ammonia at a relatively low temperature even at room temperature and under normal or reduced pressure. However, the reaction temperature is preferably about 200 to 350° C. In addition, the activity of the catalyst is not adversely affected with the presence of oxygen and carbon monoxide. Further, the catalyst according to this invention does not require being subjected to a reduction treatment.

The catalyst according to the present invention is "complex compound," which comprises:

(a) at least one of alkali metals belonging to Group 1A of the Periodic Table.
(b) at least one of the halides, oxides and sulfides of a transition metal selected from the group of metals consisting of Group 4B, Group 5B, Group 6B, Group 7B and Group 8 of the Periodic Table and
(c) graphite.

This "complex compound" comprises alkali metals as electron donors, graphite as an electron acceptor and at least one of said transition metal compounds. Thus, this complex compound is generally called as "an electron donor-acceptor complex." In the catalyst, the weight ratio of the transition metal compound to graphite is generally about 0.001–1:1, preferably 0.01–0.5:1, and the weight ratio of alkali metal to graphite-transition metal interlayer complex compounds is generally about 0.1–10:1 and preferably 0.5–1.0:1. Graphite employed for preparation of the catalyst can be produced by pyrolysis of a carbon-containing material, such as coal pitch coke and petroleum pitch coke, a gaseous hydrocarbon such as methane and ethane and carbon. The preferred graphite is produced by pyrolysis of active carbon.

The catalyst according to this invention can be produced by means of (1) subjecting a mixture of graphite and a transition metal compound to a heat treatment at a temperature of from about 250 to 500° C. for about 5 to 20 hours, (2) adding an alkali metal to the thus heat-treated mixture and thereafter (3) heating the product under a reduced pressure for example less than $10^{-1}$ cm. Hg, preferably less than $10^{-3}$ cm. Hg or in an inert gas atmosphere such as argon and nitrogen, at a temperature above the melting point of the alkali metal.

The catalyst according to this invention exhibits a remarkable adsorption of hydrogen and nitrogen. When a mixture of hydrogen and nitrogen is brought into contact with this catalyst, ammonia is formed. Likewise, with the use of the catalyst according to this invention, it is also possible to synthesize ammonia from hydrogen and air.

On the other hand, if any one or two of (a) an alkali metal, (b) graphite and (c) said specified transition metal compound are employed individually or in combination, respectively, the formation of ammonia is extremely low. In contrast, when a three-component catalyst of this invention is used, it becomes possible to increase the ammonia formation by about hundred times the said one or two-component catalyst.

The decomposition of ammonia proceeds reversibly on the catalyst of this invention, as in the case of common catalysts for the ammonia synthesis. Thus, hydrogen and nitrogen are converted on the catalyst into ammonia with a high yield at a low temperature and under a high pressure, under such conditions an equilibrium ammonia concentration is high enough.

DESCRIPTION OF PREFERRED EMBODIMENTS

The present invention will be further explained in detail by means of Examples. It should be understood that this invention is, however, in no way limited by the Examples, which are given for the purpose of only illustration of this invention. All parts given in Examples are parts by weight, unless otherwise indicated.

Example 1

Two parts of graphite and 0.2 part of ferric chloride were charged into a U-shaped glass reactor and heated at 300° C. for 20 hours under a reduced pressure to form a graphite-ferric chloride interlayer complex compound. Thereafter, 2 parts of metallic potassium was added to said complex compound and the mixture was molten at 300° C. for 20 hours under a pressure of $10^{-3}$ cm. Hg to form a three-component catalyst consisting of graphite, ferric chloride and potassium. The surface area of the thus formed catalyst was measured according to the BET Method and found to be about 20 m.² per gram.

Ammonia synthesis gas of nitrogen and hydrogen was circulated at a rate of 15 cc. per minute and under a pressure listed in Table 1 into a 300 cc. capacity of reactor packed with 4.2 g. of the catalyst produced as above. Thereafter, the ammonia gas collected into a cooler (liquid nitrogen trap) was subjected to qualitative and quantitative analysis by means of gas chromatography and infrared spectroscopy. When air was used as a source of nitrogen, the catalytic activity was not lowered even with the presence of carbon monoxide in an amount corresponding to the partial pressure of 10 to 40 cm. Hg. The reaction conditions and the results are as shown in Table 1 below

TABLE 1

| Catalyst | Partial of gas $N_2$ | Pressure (cm. Hg) $H_2$ | Reaction temp. (° C.) | Amount of/$NH_3$ formed (cc.) 20 hours | $NH_3/N_2$ (molar ratio) |
|---|---|---|---|---|---|
| K-ferric chloride-graphite | 10 | 30 | 300 | 42 | 1.0 |
| | 12 | 42 | 170 | 4 | 0.10 |
| | 13 | 40 | 110 | 1.3 | 0.03 |
| | 10 | 32 | 57 | 0.8 | 0.02 |
| | 23 | 35 | 30 | 0.1 | 0.002 |

Example 2

Catalysts were prepared according to the procedures as in Example 1 using 2 parts of graphite and a predetermined amount of ferric chloride and various alkali metals. By using 4.2 grams of these catalysts, the ammonia synthesis was carried out. The surface area of each of the catalysts was about 20 m.$^2$ per gram, respectively. The reaction conditions and the results are as shown in Table 2 below.

TABLE 2

| Catalyst (parts by weight) | Partial of gas $N_2$ | Pressure (cm. Hg) $H_2$ | Reaction temp. (° C.) | Amount of $NH_3$ formed (cc.) 20 hours | $NH_3/N_2$ (molar ratio) |
|---|---|---|---|---|---|
| K-graphite (2-2) | 8 | 24 | 306 | 0.06 | 0.002 |
| | 8 | 24 | 350 | 0.23 | 0.008 |
| $FeCl_3$-graphite (0.2-2) | 10 | 30 | 300 | 0 | 0 |
| K-$FeCl_3$-Graphite (2-0.2-2) | 10 | 30 | 300 | 42 | 1.0 |
| K-$FeCl_3$-graphite (2-1-2) | 11 | 30 | 300 | 24 | 0.52 |
| Na-$FeCl_3$-graphite (2-0.2-2) | 15 | 45 | 300 | 58 | 1.40 |
| Rb-$FeCl_3$graphite (1-0.2-2) | 15 | 45 | 300 | 42 | 1.05 |
| Li-$FeCl_3$-graphite (1-0.2-2) | 15 | 45 | 300 | 2.4 | 0.04 |
| Cs-$FeCl_3$-graphite | 15 | 45 | 300 | 52 | 0.85 |

Example 3

The ammonia synthesis was carried out by use of catalysts prepared with 2 grams of potassium, 2 parts of graphite and 1 part of ruthenium or 0.6 part of osmium as in Example 1. The surface area of each one of the catalysts was about 20 m.$^2$ per gram, respectively. The reaction conditions and the results are shown in Table 3 below.

TABLE 3

| Catalyst | Partial of gas $N_2$ | Pressure (cm. Hg) $H_2$ | Reaction temp. (° C.) | Amount of $NH_3$ formed (cc.) 20 hours | $NH_3/N_2$ (molar ratio) |
|---|---|---|---|---|---|
| K-ruthenium chloride-graphite | 15 | 40 | 300 | 23.2 | 0.58 |
| | 16 | 47 | 200 | 1.1 | 0.03 |
| | 15 | 30 | 300 | 18 | 0.45 |
| K-osmium chloride-graphite | 15 | 45 | 300 | 71 | 1.2 |
| | 15 | 45 | 350 | 120 | 2.0 |
| | 15 | 45 | 200 | 3.0 | 0.05 |

Example 4

The catalystic ammonia synthesis was carried out with air and $H_2$ on the catalysts prepared as in Example 1. A small amount of water was obtained in addition to ammonia. No decrease in catalytic activity was observed even after conducting several runs. The reaction conditions and the results are shown in Table 4 below.

TABLE 4

| Catalyst (parts by weight) | Air (cm. Hg) | Hydrogen (cm. Hg) | Reaction temp. (° C.) | $NH_3$ yield (cc.) | $NH_3/N_2$ (molar ratio) |
|---|---|---|---|---|---|
| K-$FeCl_3$-graphite (2-0.2-2) | 8.4 | 30 | 283 | 30 | 0.86 |
| | 10.0 | 40 | 298 | 34 | 0.86 |
| K-$OsCl_3$-graphite (2-0.6-2) | 19 | 40 | 307 | 28 | 0.84 |
| | 20 | 40 | 303 | 35 | 0.90 |
| | 20 | 40 | 306 | 42 | 1.10 |

Example 5

Into a 300 cc. U-shaped glass reactor was charged 2 parts of graphite (available from Union Carbide Company) and 0.2 part of nickel chloride. The charged mass was heated at 500° C. for 20 hours under a reduced pressure to form a graphite-nickel chloride interlayer complex compound. Thereafter, 2 parts of metallic potassium was added to the charged mass and the mixture was subjected to melting treatment at 300° C. for 20 hours under a pressure of 10$^{-3}$ cm. Hg to form a three-component catalyst consisting of potassium, nickel chloride and graphite. The surface area of the thus formed catalyst was about 20 m.$^2$ per gram as measured according to the BET Method.

Into said reactor packed with 4.2 grams of the three-component catalyst was introduced and recirculated a synthesis gas of hydrogen and nitrogen at a rate of 15 cc. per minute. Ammonia collected into a cooler was subjected to the qualitative and quantitative analysis through gas chromatography and infrared spectroscopy. The results are shown in Table 5 below. When air was used as a source of nitrogen, it was observed that the catalytic activity was not decreased, nor with the presence of carbon monoxide in an amount corresponding to a partial pressure of 10 to 40 cm. Hg.

TABLE 5

| Catalyst | Partial of gas $N_2$ | Pressure (cm. Hg) $H_2$ | Reaction temp. (° C.) | Amount of ammonia formed (cc.) 15 hours | $NH_3/N_2$ (molar ratio) |
|---|---|---|---|---|---|
| K-nickel chloride-graphite | 15 | 45 | 300 | 4.4 | 0.073 |

EXAMPLE 6

A three-component catalyst consisting of potassium, platinum chloride and graphite was prepared as in Example 5 except that a graphite-platinum chloride interlayer complex compound was prepared at 400° C. by use of 0.2 part of platinum chloride in place of nickel chloride. The surface area of the thus formed catalyst was about 20 m.$^2$ per gram as measured according to the BET Method. The ammonia synthesis was carried out as in Example 5 by use of 4.2 grams of said catalyst. The results are shown in Table 6 below.

TABLE 6

| Catalyst | Partial of gas $N_2$ | Pressure (cm. Hg) $H_2$ | Reaction temp. (° C.) | Amount of ammonia formed (cc.) 15 hours | $NH_3/N_2$ (molar ratio) |
|---|---|---|---|---|---|
| K-platinum chloride-graphite | 10 | 30 | 300 | 3.8 | 0.065 |

Example 7

According to the procedures in Example 5, graphite and following transition metal halides were reacted at a temperature of 300 to 350° C. form a graphite-transition metal interlayer compound which was then reacted with metallic potassium to form a three-component catalyst.

Ammonia synthesis was carried out by use of 4.5 grams of these catalysts. The reaction conditions and the results are shown in Table 7 below.

TABLE 7

| Catalyst (parts by weight) K-graphite | Partial of gas $N_2$ | Pressure (cm. Hg) $H_2$ | Reaction temp. (° C.) | Amount of ammonia formed (cc.) 15 hours | $NH_3/N_2$ (molar ratio) |
|---|---|---|---|---|---|
| (2-2) | 10 | 30 | 300 | 0.06 | 0.0015 |
| "—"—CoCl₂ (2-2-1) | 15 | 42 | 300 | 0.8 | 0.014 |
| "—"—RhCl₃ (2-2-1) | 15 | 40 | 300 | 1.2 | 0.020 |
| "—"—IrCl₄ (2-2-0.5) | 15 | 45 | 300 | 2.0 | 0.038 |
| "—"—PdCl₂ (2-2-1) | 15 | 45 | 300 | 2.6 | 0.045 |
| "—"—MoCl₅ (2-2-0.6) | 15 | 45 | 300 | 1.2 | 0.02 |
| "—"—WCl₆ (2-2-0.6) | 15 | 45 | 300 | 0.8 | 0.015 |
| K-graphite VCl₃ (2-2-0.5) | 15 | 45 | 300 | 0.5 | 0.009 |
| "—"—TiCl₄ (2-2-0.5) | 15 | 45 | 300 | 0.12 | 0.020 |
| "—"—ZrCl₄ (2-2-0.6) | 15 | 45 | 300 | 0.10 | 0.020 |
| "—"—ReCl₃ (2-2-0.6) | 15 | 45 | 300 | 0.50 | 0.009 |

Example 8

A graphite-transition metal interlayer compound was prepared at 300 to 350° C. by use of the transition metal chlorides shown in Table 8 as in Example 5, 2 grams of metallic potassium or metallic rubidium was added to the thus formed graphite-transition metal interlayer compound and the mixture was subjected to a heat treatment at a temperature of 300° C. for 20 hours to form a three-component catalyst. The ammonia synthesis was carried out by use of 4.6 grams of these catalysts. The reaction conditions and the results are shown in Table 8 below.

TABLE 8

| Catalyst (parts by weight) | Partial of gas $N_2$ | Pressure (cm. Hg) $H_2$ | Reaction temp. (° C.) | Amount of ammonia formed (cc.) 15 hours | $NH_3/N_2$ (molar ratio) |
|---|---|---|---|---|---|
| Na-graphite-PtCl₄ (2-2-0.2) | 10 | 30 | 300 | 3.2 | 0.08 |
| Na-graphite-MoCl₅ (2-2-0.6) | 10 | 30 | 300 | 1.8 | 0.06 |
| Rb-graphite-MoCl₅ (2-2-0.6) | 10 | 30 | 300 | 1.0 | 0.03 |

Example 9

A graphite-transition metal interlayer compound was prepared with the use of the transition metal oxides and transition metal sulfides given in Table 9 at a temperature of 300 to 350° C. as in Example 5. Two parts of potassium was added to the thus formed graphite-transition metal interlayer compound, and the mixture was subjected to a heat treatment at a temperature of 300° C. to form a three-component catalyst. The ammonia synthesis was carried out by use of 5 grams of these catalysts. The reaction conditions and the results are shown in Table 9 below.

TABLE 9

| Catalyst (parts by weight) | Partial of gas $N_2$ | Pressure (cm. Hg) $H_2$ | Reaction temp. (° C.) | Reaction time, hours | Amount of ammonia formed (cc.) | $NH_3/N_2$ (molar ratio) |
|---|---|---|---|---|---|---|
| K-graphite-CrO₃ (2-2-1) | 16.3 | 45.4 | 300 | 22 | 0.7 | 0.017 |
| K-graphite CrO₃ (2-2-1) | 18.0 | 42 | 300 | 20 | 1.6 | 0.22 |
|  | 15.0 | 46.1 | 300 | 20 | 0.8 | 0.013 |
| K-graphite-MoS (2-2-1) | 14.0 | 45.0 | 310 | 24 | 4.7 | 0.084 |
|  | 15.1 | 45.4 | 320 | 24 | 4.7 | 0.078 |
| K-graphite-NiS₂ (2-2-1) | 14.5 | 45.8 | 300 | 24 | 0.7 | 0.012 |
| K-graphite-FeS (2-2-0.2) | 15 | 45 | 300 | 20 | 4.8 | 0.80 |

We claim:

1. A process for preparing a catalyst comprising an electron donor-acceptor complex, consisting essentially of graphite, an alkali metal and a metal halide, comprising
   (a) heating a mixture of graphite and a halide of a metal selected from the group consisting of iron, ruthenium and osmium at a temperature of from about 250° C. to about 500° C. to form a graphite-metal-halide interlayer complex,
   (b) adding an alkali metal to the resulting interlayer complex, and
   (c) heating the resulting mixture formed in (b) under a reduced pressure or in an inert gas atmosphere at a temperature above the melting point of the alkali metal to form said electron donor-acceptor complex, wherein the weight ratio of the metal halide to graphite is from 0.01/1 to 0.5/1, and the weight ratio of the alkali metal to a graphite-metal halide interlayer complex is from 0.5/1 to 1.0/1.

2. The process of claim 1, wherein the metal halide is ferric chloride.

3. An electron donor-acceptor complex catalyst prepared by the process of Claim 1.

4. An electron donor-acceptor complex catalyst prepared by the process of Claim 2.

5. An electron donor-acceptor complex catalyst prepared by the process of Claim 1, wherein the alkali metal is potassium.

References Cited

UNITED STATES PATENTS

| 3,176,048 | 3/1965 | Yeo et al. | 252—447 |
| 3,278,632 | 10/1966 | Hambling et al. | 252—447 |
| 3,658,721 | 4/1972 | Tamaru et al. | 423—363 |
| 3,660,028 | 5/1972 | Tamaru et al. | 252—447 |
| 1,053,951 | 2/1913 | Bosch et al. | 423—362 |
| 3,287,086 | 11/1966 | Cahn | 423—359 |

FOREIGN PATENTS

| 637,664 | 3/1962 | Canada | 252—474 |

DANIEL E. WYMAN, Primary Examiner

P. E. KONOPKA, Assistant Examiner

U.S. Cl. X.R.

252—447, 474; 423—363